US007021353B2

(12) United States Patent
Constantine et al.

(10) Patent No.: US 7,021,353 B2
(45) Date of Patent: Apr. 4, 2006

(54) LABELING APPARATUS

(75) Inventors: Alan Constantine, Norwich (GB); Tim Knights, Norwich (GB); Richard Hawkes, Norwich (GB)

(73) Assignee: Sinclair International Limited, (GB)

( * ) Notice: Subject to any disclaimer, the term of this patent is extended or adjusted under 35 U.S.C. 154(b) by 203 days.

(21) Appl. No.: 09/963,118

(22) Filed: Sep. 24, 2001

(65) Prior Publication Data

Related U.S. Application Data

(63) Continuation of application No. PCT/GB00/01012, filed on Mar. 24, 2000, now abandoned.

(30) Foreign Application Priority Data

Mar. 25, 1999 (GB) .................................... 9906871

(51) Int. Cl.
*B32B 31/20* (2006.01)

(52) U.S. Cl. ...................... 156/351; 156/361; 156/367; 156/368; 156/DIG. 45

(58) Field of Classification Search ................ 156/351, 156/362, 368, 366, 354, 355, 358, 360, 361, 156/363, DIG. 44, DIG. 46, DIG. 45
See application file for complete search history.

(56) References Cited

U.S. PATENT DOCUMENTS 4,369,082 A * 1/1983 Kerwin ....................... 156/238
5,431,274 A 7/1995 Schaupp
5,472,552 A 12/1995 Speranza et al.
5,645,669 A 7/1997 Crankshaw et al.
5,741,381 A 4/1998 Dolence et al.
5,862,968 A * 1/1999 Traise ........................ 225/100
6,179,030 B1 * 1/2001 Rietheimer ................. 156/360
6,230,780 B1 * 5/2001 Rietheimer ................. 156/577
6,428,639 B1 * 8/2002 Oldenburg et al. ........... 156/64

FOREIGN PATENT DOCUMENTS

DE 35 09 987 A 10/1986
EP 0 879 764 A 11/1998

* cited by examiner

*Primary Examiner*—George Koch
(74) *Attorney, Agent, or Firm*—Salter & Michaelson

(57) ABSTRACT

A labeling apparatus is provided. The labeling apparatus includes a detachable label cassette which presents labels to be attached to fruit and/or vegetables and a label applicator which receives the label and applies it to the fruit and/or vegetables. Label strip is pulled off the label cassette by a label drive mechanism and the movement of the applicator is driven by an applicator drive mechanism both of which include stepper motor drives. A control arrangement controls both the label drive mechanism and the applicator drive mechanism and the control arrangement includes a memory device which stores parameters relating to different labels. The use of stepper motors in the drives and the use of a memory in the control arrangement makes it possible to provide for automatic set up on initiation or label change.

21 Claims, 2 Drawing Sheets

LABELING APPARATUS

This is a continuation of international application PCT/GB00/01012 filed Mar. 24, 2000, now abandoned.

BACKGROUND

1. Technical Field

The present application is directed to a labeling apparatus.

2. Related Art

In European Patent Application No. 83308035.1 there is disclosed a labeling apparatus in which a detachable label cassette supplies labels to a label applicator in the form of multiple bellows mounted at spaced apart positions on a rotatable head, the labels being sequentially taken up by respective bellows and applied to fruit and/or vegetables by rotation of the head. The supply of labels from the cassette and movement of the applicator are controlled by respective drives which are engaged or not engaged by use of mechanical clutch mechanisms.

In U.S. Pat. No. 5,829,351 there is disclosed a labeling apparatus utilizing a detachable label cassette and a label applicator utilizing multiple bellows. A single stepper motor is utilized in conjunction with two gear trains to drive both the label cassette to supply the labels and to simultaneously rotate the head.

A problem arises with these known label apparatus insofar as it is necessary, if a different size of label is to be used to either modify the clutch mechanism or to change at least one drive gear from part of one of the gear trains to ensure accurate application of the different size of label. This is obviously time consuming and interrupts operation of the apparatus.

A further problem arises with the known apparatus of European Patent Application No. 83308035 in that when a cassette of labels is attached to the machine, the machine must be manually set such that the first label is in the correct position for labeling to commence. Consequently when large numbers of applicators are used, and when there is the need for frequent label changes, this necessity for manual set-up becomes laborious and time consuming. Further manual set-up increases the time for which the operation of the machine is interrupted.

It is accordingly an object of the present disclosure to overcome or at least minimize the above-mentioned problems.

SUMMARY

Thus, and in accordance with the present disclosure there is provided a labeling apparatus including a label supply and a label applicator. The label supply is operable to supply preselected labels to the label applicator at a label transfer position and the applicator is operable to apply the preselected labels to fruit and vegetables at a label applying position, the label supply being driven by a label drive mechanism and the label applicator being driven by an applicator drive mechanism. The drive mechanisms include respective stepper motor drives, the labeling apparatus further includes respective sensors which sense movement of the applicator and the labels respectively, the respective sensors being operatively connected to the label drive mechanism and the applicator drive mechanism respectively, the apparatus being operable to undergo an initiation sequence in which the label drive mechanism drives the label supply in a reverse direction until no preselected label is detected by the label sensor and then in a forward direction until a leading edge of a preselected label is positioned at a predetermined distance from the label transfer position, and the applicator drive mechanism drives the label applicator until the applicator is positioned a predetermined distance from the label transfer position, the predetermined distance of the label applicator and the preselected label from the label transfer position being dependent upon the preselected label.

With this arrangement it is possible for a label applicator to be provided which can be manufactured in a small size and differently sized labels can be accommodated without requiring any mechanical modification to the apparatus.

The present disclosure utilizes independent stepper motor powered drive gear trains to rotate the head and to supply labels from the cassette. The use of two stepper motor drives rather than the single stepper motor drive of the prior art facilitates the use of considerably smaller stepper motors in the present disclosure. The use of the smaller stepper motors not only avoids the requirement of changing at least one drive gear when different sized labels are used, but, also, facilitates a reduction of the overall width of the machine of the present disclosure. For example, labelers according to the present disclosure can be arranged side-by-side to apply labels to two parallel lanes separated by only 2.6 inches (66 mm) center-to-center. For example, the apparatus of U.S. Pat. No. 5,829,351 requires a minimum lane separation of 4 inches center-to-center. The present disclosure, therefore, achieves more than a 35% reduction in minimum lane separation.

Preferably the apparatus also includes a memory device, the memory device being connected to the respective drive mechanisms and being operable to send drive signals to the drive mechanisms. Preferably the memory device stores a series of parameters relating to different labels and the apparatus may also comprise a user operable input linked to the memory device whereby a user can input data or select one or more of the labels or parameters stored in the memory device. The memory device may comprise an electrically erasable read-only memory (EEPROM).

BRIEF DESCRIPTION OF THE DRAWINGS

The disclosure will now be described further by way of example only and with reference to the accompanying drawings in which.

DETAILED DESCRIPTION OF THE PREFERRED EMBODIMENTS

Figure 1:
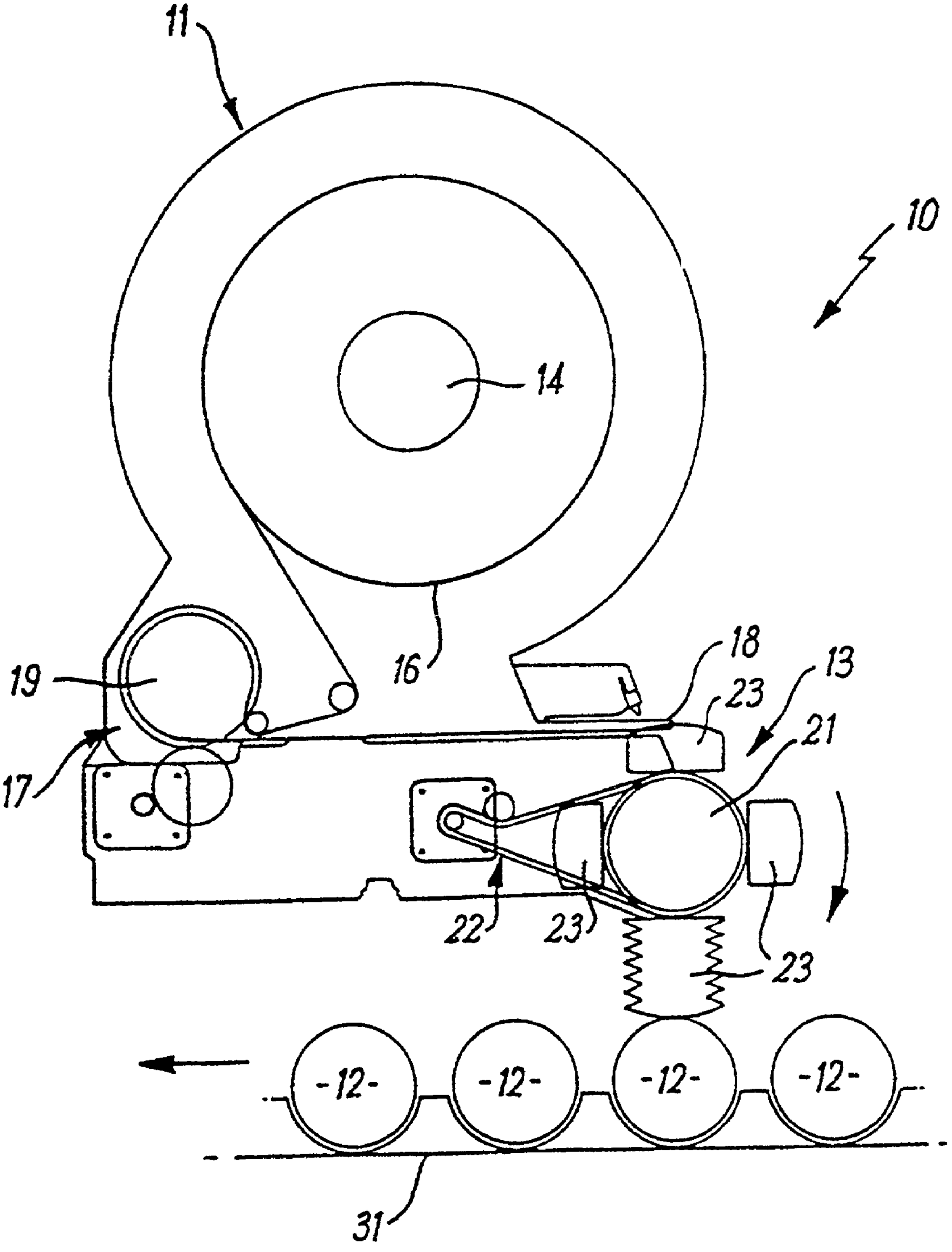
FIG. 1 is a schematic perspective view of a labeling apparatus according to the present disclosure.
Figure 2:
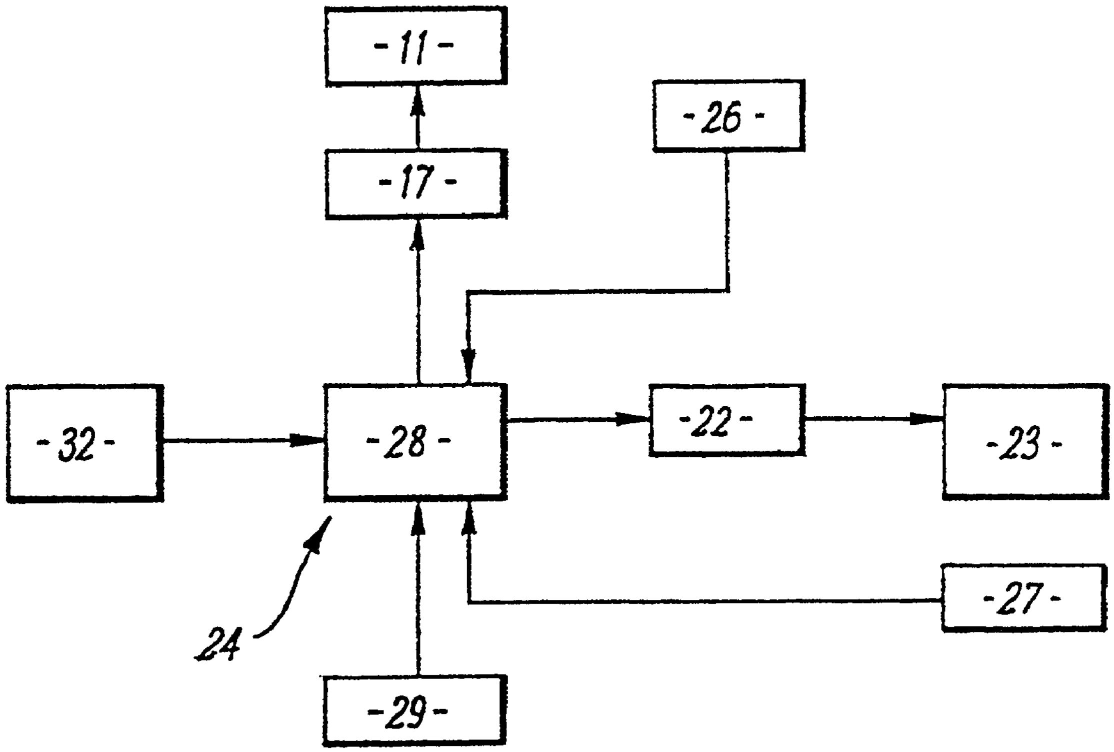
FIG. 2 is a diagrammatic representation of the drive mechanism, and control therefor, for use with the labeling apparatus of FIG. 1.

Referring now to FIG. 1 of the drawings there is shown one form of improved labeling apparatus according to the disclosure.

The labeling apparatus 10 comprises a detachable label cassette 11 which presents labels (not shown) to be attached to fruit and/or vegetables 12 at a label transfer position, and a label applicator 13 which receives the label at the label transfer position and subsequently applies it to the fruit and/or vegetables.

The label cassette 11 comprises a hub 14 upon which is mounted a reel of label strip 16. The label strip 16 comprises a label carrier upon which are removably mounted a multiplicity of labels at substantially equal spacing therealong.

The labels are removably attached to the carrier strip by way of a pressure sensitive adhesive. The cassette 11 also includes an integral label drive mechanism 17 which acts to pull the label strip 16 from the reel and advance it towards the label transfer position. The cassette 11 still further includes a separator plate 18 which is adapted to separate labels from the label carrier at the label transfer position whereby the label can be transferred to the label applicator 13. The cassette is adapted to be removably attached to the machine. It is envisaged that labels will be provided disposed within the cassette whereby changing labels, or replenishing the supply, will involve removing one cassette and replacing with another.

The drive mechanism 17 for the label strip 16 comprises a haul-off roller 19 which is adapted to engage the label strip 16 and pull the strip 16 off the reel. Once pulled off the reel, the driving of the haul-off roller 19 advances the label strip 16 towards the separator plate 18. The haul-off roller 19 is driven by a stepper motor which can be directly connected to the roller or can be linked via intermediate gearing or any other suitable connection.

The label applicator 13 comprises a body 21 which is adapted to be driven rotatably by an applicator drive mechanism 22. The body 21 carries a multiplicity of applicator heads 23 in the form of expandable bellows which are equally spaced around the periphery of the body 21. The configuration of the rotatable body 21 and the bellows 23 are as described in published European Patent Application No. 83308035.1 and, therefore, these features will not be described further herein. The rotatable body 21 is adapted to allow connection of each bellows to either a vacuum (to contract the bellows) or a low pressure air supply (to expand the bellows). This adaptation is also described in the above-mentioned European Patent Application and, therefore, these features will also not be described further herein.

The applicator drive mechanism 22 also comprises a stepper motor which is connected directly to the body 21 and is operable to cause rotation thereof to successively bring each bellows 23 respectively to a label receiving position to receive a label and a label applying position at which a label received by the bellows is applied to a fruit or vegetable. The label receiving position of the bellows 23 is that position of the bellows where a label positioned at the label transfer point can be taken up by the bellows 23.

The labeling apparatus 10 also includes a control arrangement 24 to which the label drive mechanism 17 and applicator drive mechanism 22 are connected. The control arrangement 24 comprises a label sensor 26 to sense the leading edge of the label as it reaches the separator plate 18 and a sensor 27 to sense the position of a bellows 23 on the body 21 relative to a label receiving position, both of these sensors 26, 27 being connected via a control device 28 to the label and applicator drive mechanisms 17 and 22. A fruit or vegetable sensor 29 is also provided which detects fruit or vegetables to be labeled and this sensor is also linked to the control device 28. The control device comprises a micro processor which incorporates an electrically alterable memory in any suitable form, for example electrically erasable read-only memory (EEPROM).

In use, the labeling apparatus 10 is mounted above a conveyor 31 upon which is disposed fruit and vegetables 12 to be labeled as shown schematically in FIG. 1. When the labeling apparatus 10 is first used, or one type of label is replaced with a different type by removing the cassette and replacing it with another cassette or replenishing the reel of labels in the removed cassette and replacing it, the apparatus undergoes the following initiation sequence.

Firstly, the label drive mechanism 17 is driven in a reverse direction to remove any label from the field of view of the label sensor 26. Simultaneously the applicator drive mechanism 22 is driven in reverse until a bellows 23 is detected by the sensor 27 and its position can then be accurately determined.

The label drive mechanism 17 then advances the label strip 16 towards the separator plate 18 by pulling the label strip 16 from the reel. As soon as a leading edge of the label is detected by the label sensor 26 a signal is sent to the control device 28 to halt the label drive mechanism 17. This results in the label being stopped at a predetermined position short of the label transfer position, a position which will hereafter be referred to as a label holding position. This predetermined position is dependent upon the size of the label to be applied. The applicator drive mechanism 22 also rotates the body 21 until one of the bellows 23 is in a position, also just short of the label transfer position, a point which will hereinafter be referred to as the bellows holding position. The position of the bellows 23 is detected by the applicator sensor 27 and, therefore, the bellows 23 can be accurately placed in the bellows holding position under the action of the applicator drive mechanism 22.

Once the labeling apparatus has carried out this initiation sequence, it is ready for labeling of fruit or vegetables to begin.

It will be appreciated that this initiation sequence is carried out automatically without the need for manual intervention by an operator. This is true despite the fact that the label holding position is dependent on the label used. The use of stepper motor drives and the sensor to detect the label position and bellows position means that automatic initiation can take place whatever the label size.

The fruit or vegetables passing under the apparatus 10 on a conveyor 31 are detected by a fruit or vegetable sensor 29 and a labeling sequence is then initiated. As the fruit or vegetable 12 to be labeled is detected by the fruit or vegetable sensor 29, a signal is sent to the label and applicator drive mechanisms 17 and 22 by the control device 28. The control device 28 causes the label drive mechanism 17 to be operated to advance the label strip 16 from the label holding position to the label transfer position. The control device 24 causes the applicator drive mechanism 22 to rotate the body 21 such that the bellows 23 in the bellows holding position is advanced through the bellows receiving position. As described in the above-mentioned European Application, at the bellows receiving position, the bellows is connected to a source of a vacuum whereby the label at the label transfer position can be taken up on the end of the bellows 23 and retained there by the vacuum. Once the label has been taken up by the bellows 23, as described above control device 24 continues the operation of the label and applicator drive mechanisms 17 and 22 until the label sensor 26 detects the leading edge of the next label on the label strip 16 and hence when the next label is in the label holding position, and until the applicator sensor 27 detects the next bellows 23 in the bellows holding position. With a multiplicity of bellows 23 on the body 21, it will be appreciated that as successive bellows 23 are brought to the bellows receiving position to receive a label, other bellows, which have already received labels earlier, will have moved through to a label applying position. At the label applying position, as described in the above-mentioned European Patent Application, the bellows 23 is connected to a source of low pressure air and, therefore, the bellows 23 expands to bring the end of the bellows 23 into contact with a fruit or vegetable thereby transferring the label to a surface of the fruit or vegetable.

It will be appreciated that in order for the labeling apparatus to operate successfully, the control of the drive mechanisms 17, 22 and positioning of the label strip 16 (and hence labels) and the bellows 23 is very important. Known labeling apparatus which operate in this manner, for example as disclosed in the above-mentioned European patent Application, utilize a mechanical clutch arrangement to control operation of the drive mechanisms 17, 22. If a differently sized label or differently spaced labels are used, the clutch arrangement will need to be modified or replaced in order to be able to ensure that the apparatus operates to apply the new size of label accurately. Further a change in the type of labels used will necessitate a manual re-setting of the apparatus.

In the present disclosure, the use of a stepper motor drive obviates the requirement for a mechanical clutch. This means that no change in the drive mechanism is necessary to ensure different size labels can be accommodated. The stepper motor can be driven to advance the label the correct distance to ensure its accurate placement at the label holding position. The label sensor detects the leading edge of the label and halts the stepper motor when the label reaches the correct label holding position. Still further the use of an applicator sensor allows accurate positioning of the bellows in the bellows holding position.

Further, by incorporating a memory 32 within the control device 28 which controls operation of the drive mechanisms 17, 22, into which can be stored parameters relating to different label sizes, the automatic initiation of the apparatus is further facilitated. These parameters should include data which is required to ensure that for different label sizes the positioning of the label at the label transfer position, can be accurately determined for each label size. It can also be arranged for the control device 28 to include a user selector (not shown) by which a user of the labeling apparatus can select a particular label size from those stored and by doing this the stored parameters relating to that label size are automatically utilized by the labeling apparatus to allow accurate initiation and labeling for the type of label selected.

Still further the use of stepper motor drives for the label and applicator drive mechanisms 17 and 22 enables accurate complex movement of the drive mechanism to be utilized to ensure accurate positioning of the bellows and label. In particular, the use of stepper motor drives allows the applicator and label strip to be driven in either direction. This is clearly not possible with known arrangements in which a clutch mechanism is utilized.

It is of course to be understood that the disclosure is not intended to be restricted to the above embodiments which are by way of example only.

The invention claimed is:

1. A labeling apparatus, comprising:

a label supply and a label applicator, said label supply being operable to supply preselected labels to said label applicator at a label transfer position and said applicator being operable to apply said preselected labels to fruit and vegetables at a label applying position, said label supply being driven by a label drive mechanism and said label applicator being driven by an applicator drive mechanism, each of said drive mechanisms comprising a stepper motor drive, said labeling apparatus further comprising a first sensor which senses movement of the applicator and a second sensor for sensing movement of the labels, each of said sensors being operatively connected to said label drive mechanism and said applicator drive mechanism, said apparatus being operable to undergo an initiation sequence in which said label drive mechanism drives said label supply in a reverse direction until no preselected label is detected by said label sensor and then in a forward direction until a leading edge of a preselected label is positioned at a predetermined distance from said label transfer position, and said applicator drive mechanism drives said label applicator until said applicator is positioned a predetermined distance from said label transfer position, said predetermined distance of said label applicator and said preselected label from said label transfer position being dependent upon said preselected label.

2. The labeling apparatus of claim 1, further including a memory device, said memory device being connected to said respective drive mechanisms and being operable to send drive signals to the drive mechanisms.

3. The labeling apparatus of claim 2, wherein the memory device stores a series of parameters relating to different label types.

4. The labeling apparatus of claim 3, wherein the apparatus further includes a user operable input linked to said memory device whereby a user can input data or select one or more of said labels or parameters stored in the memory device.

5. The labeling apparatus of claim 4, wherein the memory device comprises an electrically erasable read-only memory (EEPROM).

6. The labeling apparatus of claim 3, wherein the memory device comprises an electrically erasable read-only memory (EEPROM).

7. The labeling apparatus of claim 2, wherein the memory device comprises an electrically erasable read-only memory (EEPROM).

8. The labeling apparatus of claim 2, wherein the memory device stores a series of parameters relating to different label types.

9. The labeling apparatus of claim 8, wherein the memory device comprises an electrically erasable read-only memory (EEPROM).

10. A labeling apparatus, comprising:

a label supply and a label applicator, said label supply being operable to supply preselected labels to said label applicator at a label transfer position and said applicator being operable to apply said preselected labels to items at a label applying position, said label supply being driven by a label drive mechanism and said label applicator being driven by an applicator drive mechanism, each of said drive mechanisms comprising an electromechanical motor drive, said labeling apparatus further comprising a first sensor which senses movement of the applicator and a second sensor for sensing movement of the labels, each of said sensors being operatively coupled to said label drive mechanism and said applicator drive mechanism, and control means responsive to said first and second sensors and to which the label drive mechanism and the applicator drive mechanism are connected, said control means being operable to undergo an initiation sequence in which said label drive mechanism drives said label supply in a reverse direction until no preselected label is detected by said label sensor and then in a forward direction until a leading edge of a preselected label is positioned at a predetermined distance from said label transfer position, and said control means being further operable so that said applicator drive mechanism drives said applicator until said applicator is positioned a predetermined distance from said label transfer position, said predetermined distance of said label applicator and said preselected label from said label transfer position being dependent upon said preselected label.

11. The labeling apparatus of claim 10, further including a memory device, said memory device being connected to said respective drive mechanisms and being operable to send drive signals to the drive mechanisms.

12. The labeling apparatus of claim 11, wherein the memory device stores a series of parameters relating to different label types.

13. The labeling apparatus of claim 12, wherein the apparatus further includes a user operable input linked to said memory device whereby a user can input data or select one or more of said labels or parameters stored in the memory device.

14. The labeling apparatus of claim 10, wherein said label applicator comprises a body that carries multiple applicator heads.

15. The labeling apparatus of claim 14, wherein the second sensor senses the leading edge of the label as it reaches the applicator and the first sensor senses the position of the applicator head relative to a label receiving position, both said first and second sensors being connected via said control means to the label and applicator drive mechanisms.

16. A labeling apparatus, comprising:

a label supply and a label applicator, said label supply being operable to supply preselected labels to said label applicator at a label transfer position and said applicator being operable to apply said preselected labels to items at a label applying position, said label supply being driven by a label drive mechanism and said label applicator being driven by an applicator drive mechanism, each of said drive mechanisms comprising an electromechanical motor drive, said labeling apparatus further comprising a first sensor which senses movement of the applicator and a second sensor for sensing movement of the labels, each of said sensors being operatively coupled to said label drive mechanism and said applicator drive mechanism, and control means responsive to said first and second sensors and to which the label drive mechanism and the applicator drive mechanism are connected, said control means being operable in at least a forward direction until a leading edge of a preselected label is positioned at a predetermined distance from said label transfer position, and said control means being further operable so that said applicator drive mechanism drives said applicator until said applicator is positioned a predetermined distance from said label transfer position, said predetermined distance of said label applicator and said preselected label from said label transfer position being dependent upon said preselected label.

17. The labeling apparatus of claim 16, further including a memory device, said memory device being connected to said respective drive mechanisms and being operable to send drive signals to the drive mechanisms.

18. The labeling apparatus of claim 17, wherein the memory device stores a series of parameters relating to different label types.

19. The labeling apparatus of claim 18, wherein the apparatus further includes a user operable input linked to said memory device whereby a user can input data or select one or more of said labels or parameters stored in the memory device.

20. The labeling apparatus of claim 16, wherein said label applicator comprises a body that carries multiple applicator heads.

21. The labeling apparatus of claim 20, wherein the second sensor senses the leading edge of the label as it reaches the applicator and the first sensor senses the position of the applicator head relative to a label receiving position, both said first and second sensors being connected via said control means to the label and applicator drive mechanisms.

* * * * *